No. 619,904. Patented Feb. 21, 1899.
W. P. MURPHY.
SINGLETREE.
(Application filed Nov. 30, 1898.)
(No Model.)
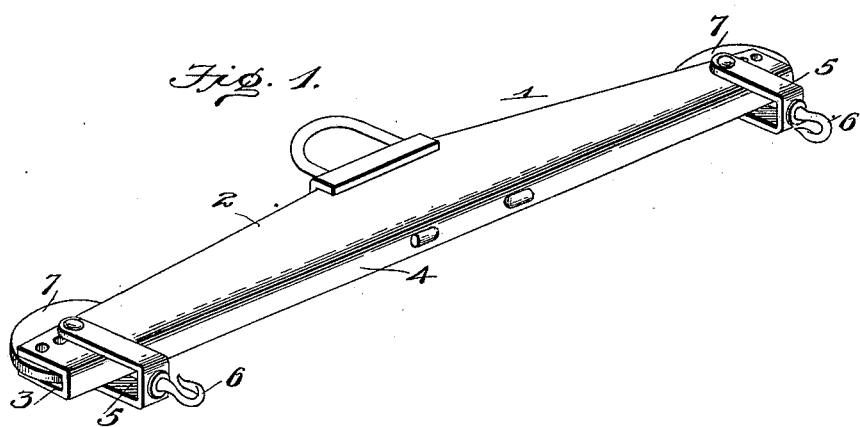
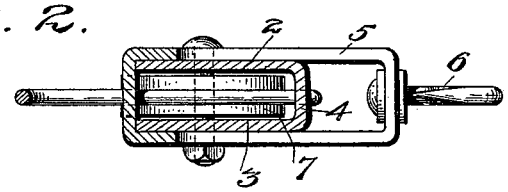
Witnesses
Inventor
William P. Murphy,
by H. B. Willson & Co.
Attorneys

UNITED STATES PATENT OFFICE.

WILLIAM P. MURPHY, OF SAN JOSÉ, CALIFORNIA.

SINGLETREE.

SPECIFICATION forming part of Letters Patent No. 619,904, dated February 21, 1899.

Application filed November 30, 1898. Serial No. 697,930. (No model.)

*To all whom it may concern:*

Be it known that I, WILLIAM P. MURPHY, a citizen of the United States, residing at San José, in the county of Santa Clara and State of California, have invented certain new and useful Improvements in Singletrees; and I do declare the following to be a full, clear, and exact description of the invention, such as will enable others skilled in the art to which it appertains to make and use the same.

The invention has relation to singletrees for agricultural implements—such, for instance, as plows, cultivators, and harrows; and the object of the invention is to provide a strong, inexpensive, and durable whiffletree and means for preventing the ends thereof barking the trees when they come in contact therewith.

With this object in view the invention consists in certain features of construction and combination of parts, which will be hereinafter fully described and claimed.

In the drawings, Figure 1 is a perspective view of my improved singletree, and Fig. 2 is a cross-sectional view of the same.

In said drawings, 1 denotes the singletree proper, preferably formed of stamped sheet metal bent to form the upper and lower sides 2 and 3 and the forward edge 4.

5 denotes clips pivoted to the ends of the singletree and provided with hooks or other fastening means 6, to which the chains or traces of the animal are adapted to be secured.

7 denotes rollers arranged between the upper and lower sides of the whiffletree, each of which has its axis pivoted in alined holes, of which there is a longitudinal series at the ends of the whiffletree, and projecting slightly beyond the ends of the singletree, so that in cultivating the ground near trees should the singletree come in contact with a tree the rollers will reduce the friction and will allow the ends to slide from engagement with the tree without breaking them.

From the foregoing description, taken in connection with the accompanying drawings, the construction, operation, and advantages of the device will be readily understood without requiring an extended explanation.

The singletree by reason of its peculiar construction is very strong and at the same time possesses but little weight.

Should the roller become worn by frequent contact with trees, so that it would not project beyond the ends of the singletree, it may be adjusted laterally in the alined holes to cause it to project beyond the ends thereof by moving it outwardly.

Having thus described my invention, what I claim, and desire to secure by Letters Patent, is—

A singletree having parallel upper and lower sides and a connecting edge, and rollers journaled between the upper and lower sides in alined apertures, whereby they may be adjusted, substantially as set forth for the purpose described.

In testimony whereof I have hereunto set my hand in presence of two subscribing witnesses.

WILLIAM P. MURPHY.

Witnesses:
L. N. DAVID,
H. A. BLANCHARD.